(12) United States Patent
Kiribuchi

(10) Patent No.: US 11,159,116 B2
(45) Date of Patent: Oct. 26, 2021

(54) MOTOR CONTROL DEVICE AND MOTOR CONTROL SYSTEM

(71) Applicant: OMRON Corporation, Kyoto (JP)

(72) Inventor: Takeshi Kiribuchi, Osaka (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/644,540

(22) PCT Filed: Dec. 17, 2018

(86) PCT No.: PCT/JP2018/046408
§ 371 (c)(1),
(2) Date: Mar. 5, 2020

(87) PCT Pub. No.: WO2019/146311
PCT Pub. Date: Aug. 1, 2019

(65) Prior Publication Data
US 2020/0195187 A1 Jun. 18, 2020

(30) Foreign Application Priority Data

Jan. 29, 2018 (JP) .............................. JP2018-012739

(51) Int. Cl.
*H02P 23/00* (2016.01)
*H02P 27/08* (2006.01)
(Continued)

(52) U.S. Cl.
CPC .............. *H02P 27/08* (2013.01); *H02K 11/21* (2016.01); *H02K 29/06* (2013.01); *H02P 5/00* (2013.01); *H02P 6/16* (2013.01); *H02P 2203/03* (2013.01)

(58) Field of Classification Search
CPC .... H02P 27/08; H02P 6/16; H02P 5/00; H02P 21/22; H02K 11/21; H02K 29/06
See application file for complete search history.

(56) References Cited

U.S. PATENT DOCUMENTS

2010/0219787 A1 9/2010 Iwashita et al.
2013/0049670 A1 2/2013 Terada
(Continued)

FOREIGN PATENT DOCUMENTS

CN 107040170 A 8/2017
JP H08-289599 A 11/1996
(Continued)

OTHER PUBLICATIONS

An English translation of the International Search Report("ISR") of PCT/JP2018/046408 dated Feb. 19, 2019.
(Continued)

*Primary Examiner* — Karen Masih
(74) *Attorney, Agent, or Firm* — Metrolex IP Law Group, PLLC

(57) ABSTRACT

The present invention improves performance of a motor control device. A slave device (90) includes: an inverter (73) configured to drive a motor (74); and a control section (10) configured to control the motor (74) via the inverter (73). The control section (10) includes: a feedback signal obtaining section configured to obtain a feedback signal indicative of a predetermined physical quantity corresponding to an operating state of the motor (74); a communication section (120) configured to communicate with a PLC (100); and a PWM signal output section (130) configured to supply a motor driving signal to the inverter (73). The control section (10) is implemented by a single IC chip.

8 Claims, 5 Drawing Sheets

(51) Int. Cl.
  *H02K 11/21* (2016.01)
  *H02K 29/06* (2006.01)
  *H02P 5/00* (2016.01)
  *H02P 6/16* (2016.01)

(56) References Cited

U.S. PATENT DOCUMENTS

| | | | |
|---|---|---|---|
| 2013/0264988 A1* | 10/2013 | Iwashita | H02P 23/0077 |
| | | | 318/568.1 |
| 2014/0197774 A1 | 7/2014 | Liu et al. | |
| 2014/0300305 A1 | 10/2014 | Itamoto | |
| 2016/0246281 A1† | 8/2016 | Okubo | |
| 2017/0343382 A1 | 11/2017 | Fukumura et al. | |
| 2018/0022443 A1† | 1/2018 | Nakagawa | |
| 2019/0003856 A1 | 1/2019 | Kawakami et al. | |

FOREIGN PATENT DOCUMENTS

| | | | |
|---|---|---|---|
| JP | 2010-206902 A | | 9/2010 |
| JP | 2011-036027 A | | 2/2011 |
| JP | 2012-105455 A | | 5/2012 |
| JP | 2012105455 | † | 5/2012 |
| JP | 2014-204556 A | | 10/2014 |
| JP | 2015-002596 A | | 1/2015 |
| JP | 2015002596 | † | 1/2015 |
| JP | 2015-192473 A | | 11/2015 |
| JP | 2017-147841 A | | 8/2017 |
| JP | 2018-014800 A | | 1/2018 |
| WO | 2013/031268 A1 | | 3/2013 |
| WO | 2015/068213 A1 | | 5/2015 |
| WO | 2017/104674 A1 | | 6/2017 |

OTHER PUBLICATIONS

The Written Opinion("WO") of PCT/JP2018/046408 dated Feb. 19, 2019.

Japanese Office Action dated May 25, 2021 in a counterpart Japanese patent application.

NXP, "AN10661 Brushless DC Motor Control Using the LPC2141", Retrieved from the Internet: URL:https://www.nxp.com/docs/en/application-note/AN10661.pdf (retrieved on Jul. 22, 2016), Oct. 17, 2007, pp. 1-18, XP055290511, NXP Semiconductors; Relevance is indicated in the EESR issued on Aug. 30, 2021 in a counterpart EP patent application.

Texas Instruments, "Motor Control, Current Measurement,1-Bit,10MHz,2nd-Order,Delta-Sigma Modulator", SBAS318C, Retrieved from the Internet: URL:https://www.ti.com/lit/ds/symlink/ads1203.pdf (retrieved on Aug. 19, 2021), Jan. 2008, pp. 1-36, XP055833551; Relevance is indicated in the EESR issued on Aug. 30, 2021 in a counterpart EP patent application.

Extended European search report (EESR) dated Aug. 30, 2021 in a counterpart European patent application.

* cited by examiner
† cited by third party

MOTOR CONTROL DEVICE AND MOTOR CONTROL SYSTEM

TECHNICAL FIELD

An aspect of the present invention relates to a motor control device.

BACKGROUND ART

Various techniques for controlling (driving) a motor have been conventionally proposed. For example, Patent Literature 1 discloses a technique that has an object to ensure safety that a motor driving system is required to maintain. Patent Literature 2 discloses a technique that has an object to detect trouble that occurs during operation of a motor.

CITATION LIST

Patent Literatures

[Patent Literature 1]
Japanese Patent Application Publication Tokukai No. 2017-147841
[Patent Literature 2]
Japanese Patent Application Publication Tokukai No. 2014-204556

SUMMARY OF INVENTION

Technical Problem

An aspect of the present invention has an object to improve performance of a motor control device.

Solution to Problem

In order to attain the object, a motor control device in accordance with an aspect of the present invention is a motor control device for controlling a motor, the motor control device including: an electric power converting section configured to drive the motor; and a control section configured to control the motor via the electric power converting section, the control section including: a feedback signal obtaining section configured to obtain a feedback signal indicative of a predetermined physical quantity corresponding to an operating state of the motor; a communication section configured to communicate with a master device, which is a host device with respect to the motor control device; and a motor driving signal output section configured to supply, to the electric power converting section, a motor driving signal for causing the electric power converting section to drive the motor, and the control section being implemented by a single integrated circuit (IC) chip.

Advantageous Effects of Invention

An aspect of the present invention makes it possible to improve performance of a motor control device.

DESCRIPTION OF EMBODIMENTS

Embodiment 1

An embodiment in accordance with an aspect of the present invention (hereinafter also referred to as "Embodiment 1 or 2") is described below with reference to the drawings.

§ 1 APPLICATION EXAMPLE

Figure 1:
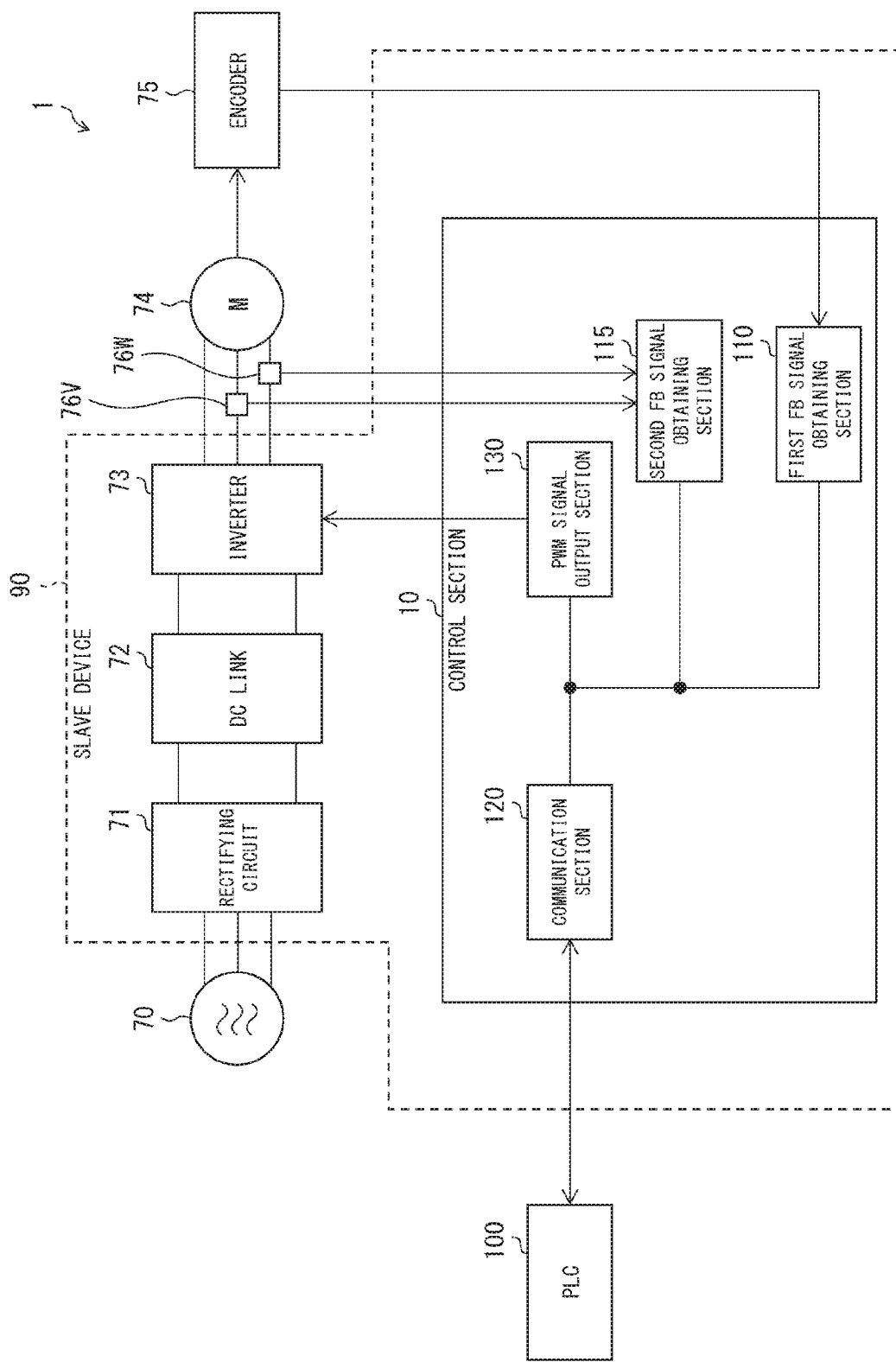
FIG. 1 is a view illustrating a configuration of a main part of an FA system of Embodiment 1.

FIG. 1 is a view illustrating a configuration of a main part of a factory automation (FA) system 1 (motor control system) of Embodiment 1. The FA system 1 includes at least one slave device 90 (motor control device) and a programmable logic controller (PLC) 100 (master device). The PLC 100 is an example of a host device (master device) with respect to the at least one slave device 90. The FA system 1 further includes an electric power source 70, a motor 74, and an encoder 75 (position detecting section) configured to detect a position of a rotor of the motor 74. The encoder 75 is provided (e.g., attached) to the motor 74.

The at least one slave device 90 includes a control section 10 (chip section) configured to control the motor 74. The at least one slave device 90 further includes a rectifying circuit 71, a direct current (DC) link 72, and an inverter 73 (electric power converting section). The control section 10 supplies, to the inverter 73, a motor driving signal (e.g., a pulse width modulation (PWM) signal) for causing the inverter 73 to drive the motor 74. The inverter 73 drives the motor 74 in accordance with the PWM signal. The control section 10 thus controls (drives) the motor 74 via the inverter 73.

The control section 10 includes a first feedback (FB) signal obtaining section 110 (first feedback signal obtaining section, feedback signal obtaining section), a second FB signal obtaining section 115 (second FB signal obtaining section, feedback signal obtaining section), a communication section 120, and a PWM signal output section 130 (motor driving signal output section). The first FB signal obtaining section 110 and the second FB signal obtaining section 115 are generically referred to as a feedback signal obtaining section (FB signal obtaining section). In other words, Embodiment 1 describes an example of a case where the FB signal obtaining section includes the first FB signal obtaining section 110 and the second FB signal obtaining section 115. The FB signal obtaining section obtains a feedback signal (FB signal) indicative of a predetermined physical quantity corresponding to an operating state of the motor 74. The communication section 120 communicates with the PLC 100. The PWM signal output section 130 supplies the PWM signal (motor driving signal) to the inverter 73.

According to Embodiment 1, the control section 10 (three functional sections, i.e., the FB signal obtaining section, the communication section 120, and the PWM signal output section 130) is implemented by a single integrated circuit (IC) chip. That is, the control section 10 is packaged as a one-chip IC. This allows the control section 10 to be smaller in mounting area than a conventional control section. In addition, the functional sections of the control section 10 can carry out data communication therebetween at a higher speed. This allows the control section 10 to carry out a process at a higher speed. Furthermore, the control section 10 that carries out a process at a higher speed leads to achievement of a reduction in electric power consumption by the control section 10. The control section 10 thus configured allows the motor control device to have higher performance than a conventional motor control device.

§ 2 CONFIGURATION EXAMPLE (Overview of FA System 1)

Figure 2:
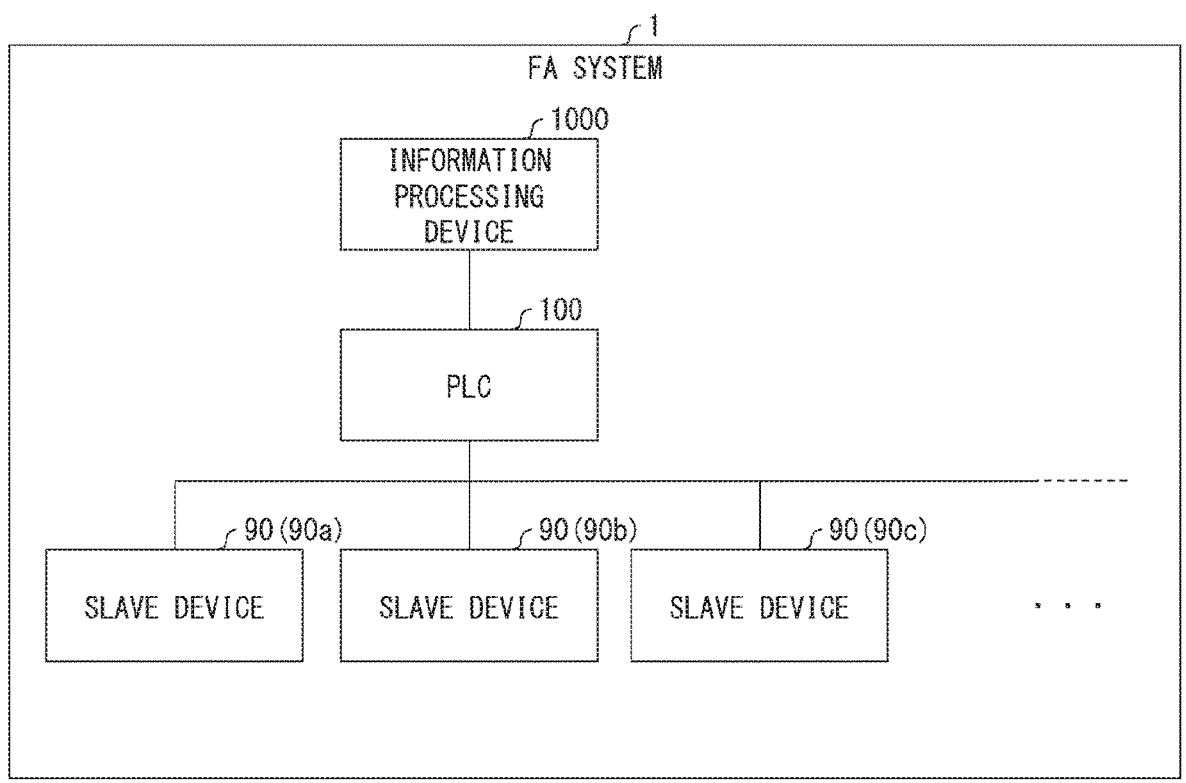
FIG. 2 is a functional block diagram schematically illustrating an overall configuration of the FA system of FIG. 1.

FIG. 2 is a functional block diagram schematically illustrating an overall configuration of the FA system 1. The FA system 1 includes an information processing device 1000, the PLC 100, and the at least one slave device 90. The FA system 1 is a unit obtained by integrating, as a functional unit, production facilities including a plurality of machines provided in a factory. The FA system 1 is a system that achieves automation of a factory production process. The FA system 1 is achieved by a master-slave control system.

In the FA system 1, the PLC 100 (master device) can be referred to as a network master. In contrast, the at least one slave device 90 can be referred to as a network slave. The PLC 100 controls the at least one slave device 90.

Upon receiving an operation of a user, the information processing device 1000 causes the user to set an operation condition of the FA system 1. The information processing device 1000 is, for example, a programming terminal. The information processing device 1000 can control the PLC 100. The PLC 100 can supply data to each of the at least one slave device 90. The PLC 100 can also obtain data from each of the at least one slave device 90.

Note that an industrial PC platform (IPC) can be used as the information processing device 1000 or the PLC 100.

Each of the at least one slave device 90 is connected to the information processing device 1000 via the PLC 100. Each of the at least one slave device 90 carries out, at a command from the PLC 100, one or more functions related to a production process. For convenience, three slave devices 90 illustrated in FIG. 2 are also referred to as respective slave devices 90a to 90c. The information processing device 1000 can control the slave devices 90a to 90c via the PLC 100. The slave devices 90a to 90c communicate with each other via the PLC 100. FIG. 2 illustrates a case where the at least one slave device 90 comprises a plurality of slave devices 90. Note, however, that the at least one slave device 90 can be a single slave device 90.

(Example of Circuit Configuration)

Figure 3:
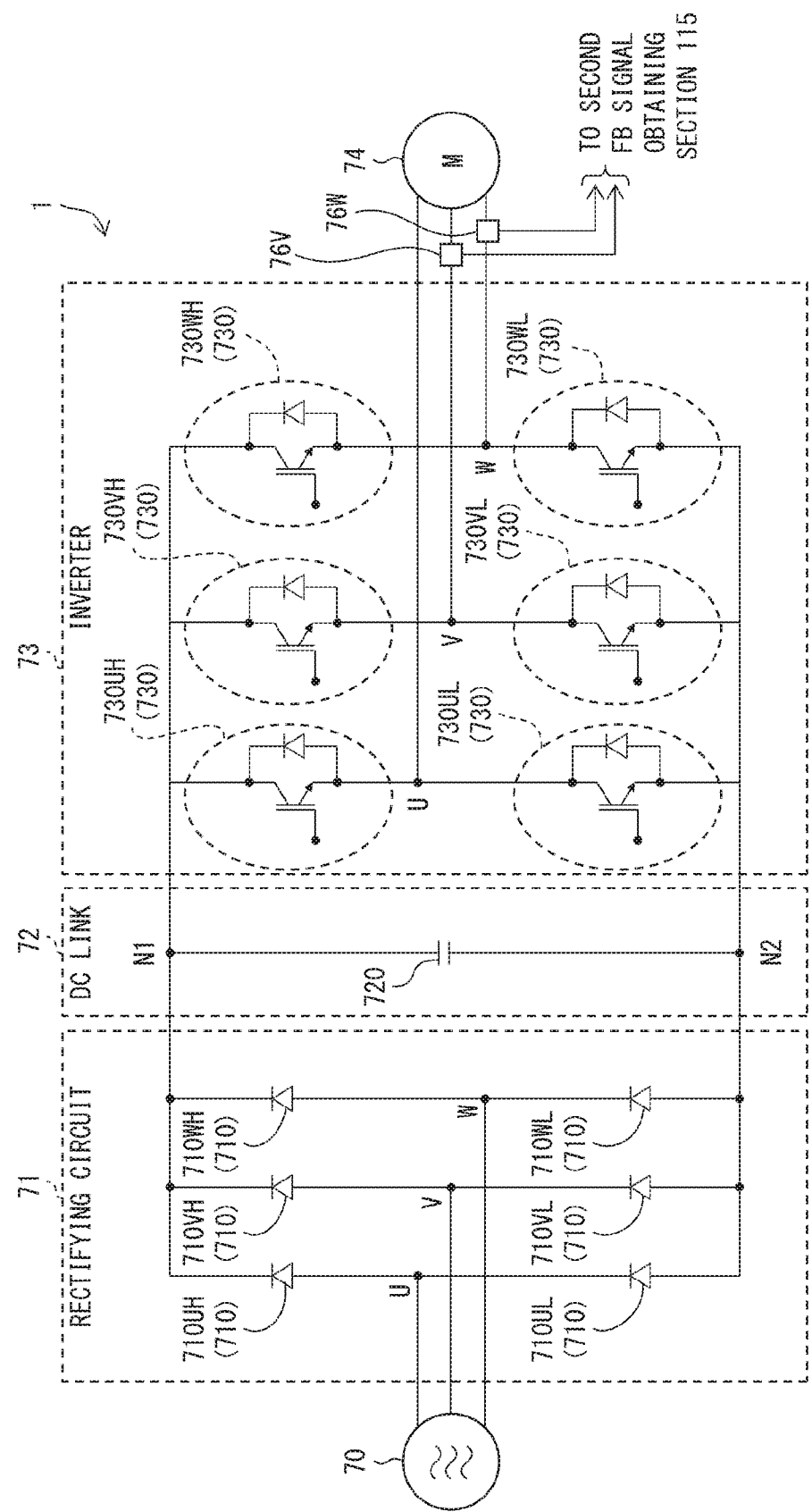
FIG. 3 is a view illustrating an example of a circuit configuration of a slave device of FIG. 1 between an electric power source and a motor.

FIG. 3 is a view illustrating an example of a circuit configuration between the electric power source 70 and the motor 74 in the FA system 1. The following description discusses an example of a case where the motor 74 is a three-phase alternating current (alternative current, AC) induction motor (IM). Note, however, that the motor 74 can alternatively be a three-phase alternating current synchronous motor (SM). Alternatively, the motor 74 can be a single-phase or two-phase alternating current motor. Further alternatively, the motor 74 can be a direct current motor.

The electric power source 70 is a publicly known three-phase alternating current power source. The following description denotes phases of a three-phase alternating current as a U-phase, a V-phase, and a W-phase, respectively. The electric power source 70 is connected to the rectifying circuit 71. The rectifying circuit 71 includes six rectifying elements 710. For example, the rectifying elements 710 are each a diode. By rectifying an alternating current voltage (alternating current power) supplied from the electric power source 70, the rectifying circuit 71 converts the alternating current voltage into a direct current voltage (direct current power). The rectifying circuit 71 serves as an AC/DC converter.

The six rectifying elements 710 constitute a three-phase full-wave rectifying circuit. Of the six rectifying elements 710, (i) two rectifying elements 710 are each connected to the U-phase of the electric power source 70, (ii) two rectifying elements 710 are each connected to the V-phase of the electric power source 70, and (iii) two rectifying elements 710 are each connected to the W-phase of the electric power source 70.

In FIG. 3, the six rectifying elements 710 are also referred to as follows:

rectifying element 710 UH (U-phase upper arm rectifying element)

rectifying element 710 UL (U-phase lower arm rectifying element)

rectifying element 710 VH (V-phase upper arm rectifying element)

rectifying element 710 VL (V-phase lower arm rectifying element)

rectifying element 710 WH (W-phase upper arm rectifying element)

rectifying element 710 WL (W-phase lower arm rectifying element)

Note that the term "upper arm rectifying element" generically refers to a rectifying element 710 connected to a node N1 of the DC link 72 (a capacitor 720). Note also that the term "lower arm rectifying element" generically refers to a rectifying element 710 connected to a node N2 of the DC link 72. Meanings of the terms "upper arm" and "lower arm" also apply to the inverter 73 (described later).

The rectifying circuit 71 is connected to the inverter 73 via the DC link 72. The DC link 72 includes the capacitor 720. The capacitor 720 has two nodes one and the other one of which are referred to as N1 and N2, respectively. The capacitor 720 smooths a direct current voltage supplied from the rectifying circuit 71. In the circuit configuration of FIG. 3, (i) the node N1 corresponds to a positive electrode of the capacitor 720, and (ii) the node N2 corresponds to a negative electrode of the capacitor 720. The DC link 72 can be alternatively referred to as a smoothing circuit.

The inverter 73 includes six switching elements 730. Embodiment 1 describes an example of a case where the inverter 73 is a voltage inverter. Note, however, that the inverter 73 can alternatively be an electric current inverter. By switching a direct current voltage (direct current power) supplied from the DC link 72, the inverter 73 converts the direct current voltage into an alternating current voltage (alternating current power). The inverter 73 serves as a DC/AC converter.

The switching elements 730 are configured such that an insulated gate bipolar transistor (IGBT) and a diode (reflux diode) are connected in parallel. Of the six switching elements 730, (i) two switching elements 730 are each connected to the U-phase of the motor 74, (ii) two switching elements 730 are each connected to the V-phase of the motor 74, and (iii) two switching elements 730 are each connected to the W-phase of the motor 74. "The U-phase of the motor 74" more precisely means "the U-phase of a stator winding of the motor 74". This point also applies to each of the V-phase and the W-phase.

In FIG. 3, the six switching elements 730 are also referred to as follows:

switching element 730 UH (U-phase upper arm switching element)

switching element 730 UL (U-phase lower arm switching element)

switching element 730 VH (V-phase upper arm switching element)

switching element 730 VL (V-phase lower arm switching element)

switching element 730 WH (W-phase upper arm switching element)

switching element 730 WL (W-phase lower arm switching element)

The inverter 73 supplies, to the motor 74, the voltage (alternating current voltage), into which the direct current voltage has been converted. By providing the inverter 73, it is possible to supply, to the motor 74, a three-phase alternating current voltage having a desired wave form (e.g., a three-phase alternating current voltage having a desired frequency and a desired amplitude). Thus, it is possible to control operation of the motor 74 by controlling operation of the inverter 73 (ON (electrical conduction)/OFF (disconnection) of each of the six switching elements 730). That is, the motor 74 can be driven under a desired operating condition. According to Embodiment 1, the motor 74 is driven by, for example, PWM control.

(Example of Method for Controlling Motor 74)

The following description discusses, by referring to FIG. 1 again, an example of a method for controlling the motor 74. Embodiment 1 describes an example of a case where the FB signal obtaining section includes the first FB signal obtaining section 110 and the second FB signal obtaining section 115. That is, Embodiment 1 describes an example of a case where the first FB signal obtaining section 110 and the second FB signal obtaining section 115 are used to carry out feedback control with respect to the motor 74. Thus, the FB signal is assumed to include a first FB signal and a second FB signal each described later. Note, however, that the FB signal obtaining section can be alternatively constituted by either the first FB signal obtaining section 110 or the second FB signal obtaining section 115. That is, the FB signal can alternatively be either the first FB signal or the second FB signal.

The encoder 75 is, for example, a rotary encoder. The encoder 75 detects a position of the rotor of the motor 74 (more specifically, a rotation angle of the motor 74) (hereinafter denoted as "θm"). "A rotation angle of the motor 74" more precisely means "a rotation angle of the rotor of the motor 74". θm is an example of a predetermined physical quantity corresponding to the operating state of the motor 74. The encoder 75 outputs a signal indicative of θm (hereinafter referred to as an "angle detecting signal"). The angle detecting signal is, for example, a serial data signal (digital data). The encoder 75 thus outputs the angle detecting signal in a form of a signal indicative of numeric data.

The following description discusses operation of each section of the control section 10. The first FB signal obtaining section 110 obtains, from the encoder 75, the angle detecting signal serving as a first feedback signal (the first FB signal). Specifically, the first FB signal obtaining section 110 obtains the first FB signal (angle detecting signal) from the encoder 75 at every predetermined cycle (communication cycle). The first FB signal obtaining section 110 is used for, for example, position feedback.

The FA system 1 includes electric current detectors 76V and 76W. The second FB signal obtaining section 115 obtains, via the respective electric current detectors 76V and 76W, signals each indicating an electric current supplied from the inverter 73 to the motor 74 (hereinafter referred to as "electric current detecting signals"). The electric current is another example of the predetermined physical quantity corresponding to the operating state of the motor 74. For example, the second FB signal obtaining section 115 detects, via the electric current detectors 76V and 76W, electric currents supplied from the inverter 73 to respective predetermined two phases (e.g., the V-phase and the W-phase) of the motor 74 (see FIGS. 1 and 3).

For example, the electric current detectors 76V and 76W are each a publicly known analog electric current detector. The electric current detector 76V detects an electric current supplied from the inverter 73 to the V-phase of the motor 74. The electric current detector 76W detects an electric current supplied from the inverter 73 to the W-phase of the motor 74. The electric current detectors 76V and 76W output their respective detection results in a form of the electric current detecting signals. In the FA system 1, the electric current detecting signals are each an analog signal (analog data).

For example, the second FB signal obtaining section 115 is constituted by a delta sigma analog-digital (AD) converter. The second FB signal obtaining section 115 converts, into a digital signal (digital data), the electric current detecting signals obtained from the respective electric current detectors 76V and 76W and each serving as an analog signal. The second FB signal obtaining section 115 obtains, in a form of a second feedback signal (the second FB signal) corresponding to a torque value of the motor 74, the electric current detecting signals having been converted into the digital signal. Note, however, that the second FB signal obtaining section 115 can be constituted by a common AD converter in which a delta sigma method is not employed.

The first FB signal obtaining section 110 is connected to each of the communication section 120 and the PWM signal output section 130. The first FB signal obtaining section 110 can supply the first FB signal to at least one of the communication section 120 and the PWM signal output section 130. Similarly, the second FB signal obtaining section 115 is connected to each of the communication section 120 and the PWM signal output section 130. The second FB signal obtaining section 115 can supply the second FB signal to at least one of the communication section 120 and the PWM signal output section 130. The FB signal obtaining section thus can supply the FB signal to at least one of the communication section 120 and the PWM signal output section 130.

The FB signal obtaining section (the first FB signal obtaining section 110 and the second FB signal obtaining section 115) is achieved in a form of a functional section (part) of the control section 10, which is a one-chip IC. The first FB signal obtaining section 110 communicates with (receives data from) the encoder 75 in a publicly known communication mode (first communication mode). Examples of the first communication mode include RS422 and RS485. The first communication mode can be a publicly known serial communication mode. The first FB signal obtaining section 110 thus configured carries out a digital process for obtaining the first FB signal. This allows the control section 10, which is packaged as a one-chip IC, to suitably obtain the first FB signal.

The second FB signal obtaining section 115 is constituted by a publicly known AD converter as described earlier. This allows the control section 10, which is packaged as a one-chip IC, to suitably obtain the second FB signal from each of the electric current detectors 76V and 76W, each being an analog electric current detector.

The communication section 120 is a communication interface between the control section 10 (at least one slave device 90) and the PLC 100 (master device). The communication section 120 communicates with the PLC 100 (transmit/receive data to/from the PLC 100) in a second communication mode different from the first communication mode. Examples of the second communication mode include Ethernet (Registered Trademark) for control automation technology (EtherCAT (Registered Trademark)) and MECHATROLINK (Registered Trademark). The second communication mode can be a publicly known communication mode conforming to a field network.

The communication section 120 is achieved in a form of a functional section (part) of the control section 10, which is a one-chip IC. Examples of the communication section 120 include ET1100.

According to Embodiment 1, the communication section 120 supplies, to the PLC 100, the first FB signal obtained from the first FB signal obtaining section 110. The communication section 120 supplies, to the PLC 100, the second FB signal obtained from the second FB signal obtaining section 115.

In accordance with an operation condition of the motor 74 which operation condition is set by the user, the PLC 100 generates one or more command signals with respect to the motor 74 (e.g., calculates one or more command values with respect to the motor 74). For example, the PLC 100 generates a first command value (command value for a rotation angle of the motor 74) and a second command value (command value for an electric current supplied to the motor 74). The PLC 100 uses, as a feedback value (first FB value) with respect to the first command value, θm indicated by the first FB signal. The PLC 100 also uses, as a feedback value (second FB value) with respect to the second command value, a value of an electric current which value is indicated by the second FB signal.

In accordance with a result of comparison between each of the command values and a corresponding FB value (e.g., a difference between each of the command values and a corresponding FB value), the PLC 100 carries out a process (motor control process) for controlling the motor 74. That is, in accordance with the result of comparison, the PLC 100 carries out feedback processing (FB processing) for controlling the motor 74. The PLC 100 thus can carry out the motor control process (FB processing) in accordance with each of the FB signals. For example, according to Embodiment 1, the PLC 100 supplies a result of the FB processing (hereinafter referred to as an "FB processing result") to the PWM signal output section 130 via the communication section 120. The PWM signal output section 130 generates the PWM signal (motor driving signal) in accordance with the FB processing result. Note, however, that the PLC 100 can alternatively generate the PWM signal.

The PWM signal is a signal for controlling ON/OFF of each of the six switching elements 730 of the inverter 73. The PWM signal can also be understood as a signal for driving the motor 74 via the inverter 73. The PWM signal is thus an example of the motor driving signal (signal for causing the inverter 73 to drive the motor 74). For example, the PWM signal output section 130 adjusts a duty ratio (also referred to as a "duty cycle") of the PWM signal in accordance with the FB processing result.

According to Embodiment 1, the PLC 100 supplies the FB processing result to the PWM signal output section 130 via the communication section 120. The FB processing is commonly a more complicated process (a process higher in calculation cost) than a process for generating the PWM signal (a PWM signal generating process). With the configuration of Embodiment 1, the PLC 100 carries out such a complicated process. Specifically, the PLC 100 carries out substantial motor control.

(Effect)

The control section 10 includes three functional sections, which are the FB signal obtaining section (a functional section configured to obtain the FB signal), the communication section 120 (a functional section configured to communicate with the PLC 100), and the PWM signal output section 130 (a functional section configured to output the motor driving signal). The control section 10 is packaged as a one-chip IC.

In contrast, conventional techniques (e.g., Patent Literatures 1 and 2) do not teach any configuration in which at least one three functional sections including an FB signal obtaining section, a communication section, and a PWM signal output section are packaged as a one-chip IC. The FB signal obtaining section, the communication section, and the PWM signal output section are each commonly achieved in a form of a dedicated IC. Thus, it is conventionally common for these three functional sections to be implemented by respective ICs.

According to the configuration of Embodiment 1, the control section 10 is packaged as a one-chip IC. This allows the motor control device to be smaller in mounting area than a conventional motor control device. In addition, the three functional sections, which are the FB signal obtaining section, the communication section 120, and the PWM signal output section 130, are packaged as a one-chip IC. Thus, the three functional sections that are packaged as a one-chip IC can carry out data communication therebetween at a higher speed as compared with a case where the three functional sections are implemented by respective IC1 chips.

Furthermore, the three functional sections that are packaged as a one-chip IC can carry out data communication therebetween at a higher speed as compared with a case where two (e.g., the communication section and the PWM signal output section) of the three functional sections are mounted on a single IC1 chip (first IC1 chip) and the remaining one (e.g., the FB signal obtaining section) of the three functional sections is mounted on another IC1 chip (second IC1 chip).

Embodiment 1 allows the functional sections to carry out data communication therebetween at a higher speed. This allows the control section 10 to carry out a process at a higher speed. In addition, the control section 10 that carries out a process at a higher speed brings about an advantage of allowing a reduction in electric power consumption by the control section 10. As described earlier, Embodiment 1 allows the at least one slave device 90 to have higher performance.

Furthermore, according to the configuration of Embodiment 1, the PLC 100 carries out substantial motor control. That is, the control section 10 does not need to carry out substantial motor control. This (i) allows the control section 10 to carry out a process at a higher speed and (ii) allows the control section 10 to consume less electric power.

According to the configuration of Embodiment 1, the functional sections of the control section 10 can carry out data communication therebetween at a higher speed. This allows the FB signal to be transmitted from the at least one slave device 90 to the PLC 100 (master device) at a high speed. Thus, even in a case where the PLC 100 carries out the feedback processing, the control section 10 can respond at a sufficiently high speed. Thus, the control section 10 does not need to carry out the feedback processing (i.e., carry out substantial motor control). This makes it unnecessary for the at least one slave device 90 to have high performance.

The control section 10 includes, as the FB signal obtaining section, both the first FB signal obtaining section 110 and the second FB signal obtaining section 115. Thus, the control section 10 that includes both the first FB signal obtaining section 110 and the second FB signal obtaining section 115 can more freely carry out control with respect to the motor 74 than the control section 10 that includes only one of the first FB signal obtaining section 110 and the second FB signal obtaining section 115.

[Variation]

Figure 4:
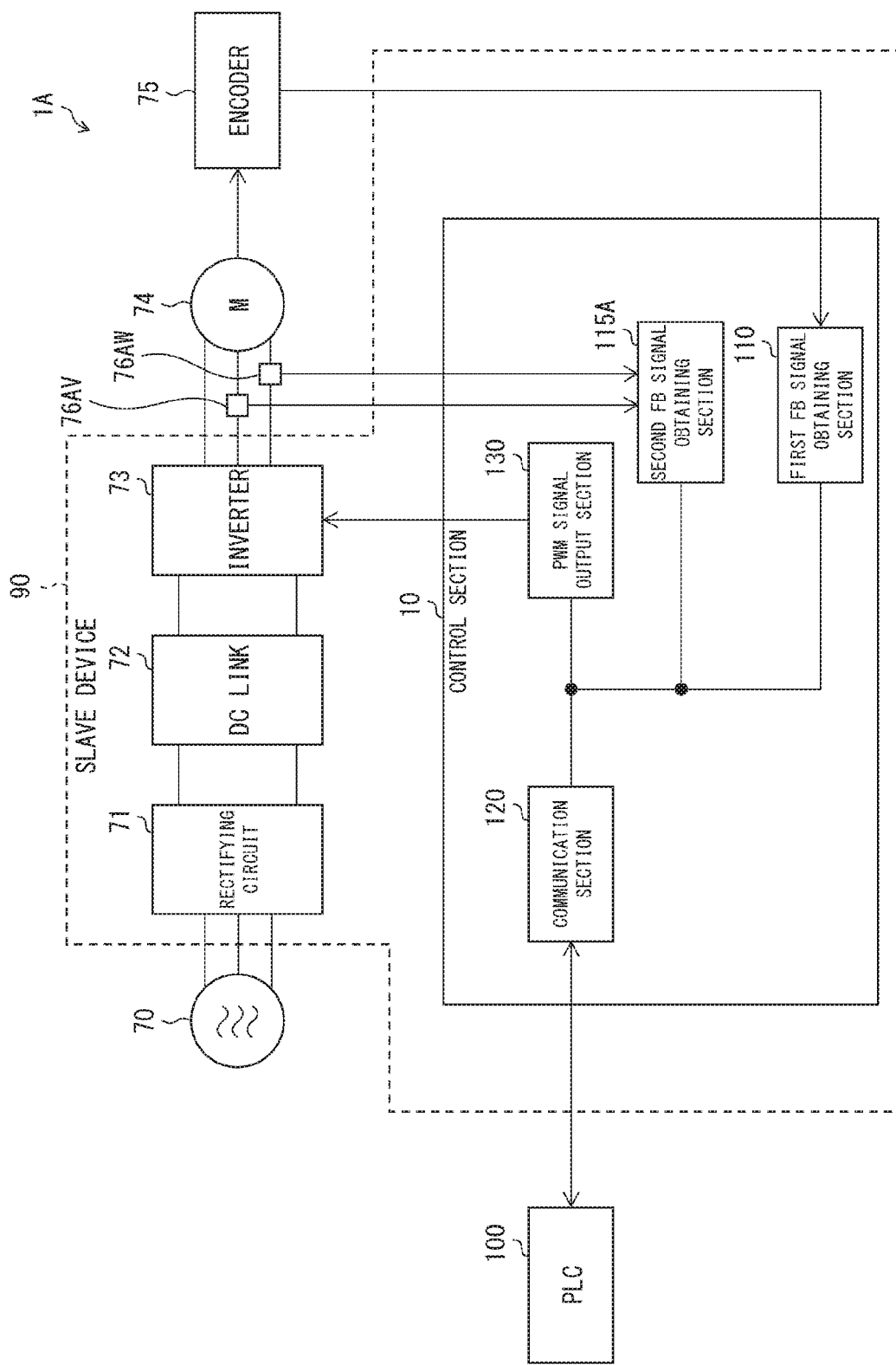
FIG. 4 is a view illustrating a configuration of a main part of an FA system in accordance with a variation of Embodiment 1.

FIG. 4 is a view illustrating a configuration of a main part of an FA system 1A (motor control system). The FA system 1A is a variation of the FA system 1. The FA system 1A includes electric current detectors that are referred to as respective electric current detectors 76AV and 76AW. The FA system 1A includes a second FB signal obtaining section that is referred to as a second FB signal obtaining section 115A (second FB signal obtaining section, feedback signal obtaining section).

Unlike the electric current detectors 76V and 76W, the electric current detectors 76AV and 76AW are each a publicly known digital electric current detector. The electric current detectors 76V and 76W output their respective detection results in a form of electric current detecting signals. In the FA system 1A, the electric current detecting signals are each, for example, a serial data signal (digital data).

The second FB signal obtaining section 115A obtains, from the respective electric current detectors 76V and 76W, the electric current detecting signals each serving as a second FB signal. The second FB signal obtaining section 115A communicates with (receives data from) the electric current detectors 76V and 76W in a publicly known serial communication mode. The second FB signal thus can be supplied to the second FB signal obtaining section 115A by serial communication. In this case, the second FB signal obtaining section 115A does not need to have an AD conversion function. Thus, as compared with the FA system 1, the FA system 1A can make the second FB signal obtaining section simpler in configuration.

Embodiment 2

The following description discusses Embodiment 2. Note that, for convenience, members having functions identical to those of the respective members described in Embodiment 1 are given respective identical reference signs, and a description of those members is omitted here.

Figure 5:
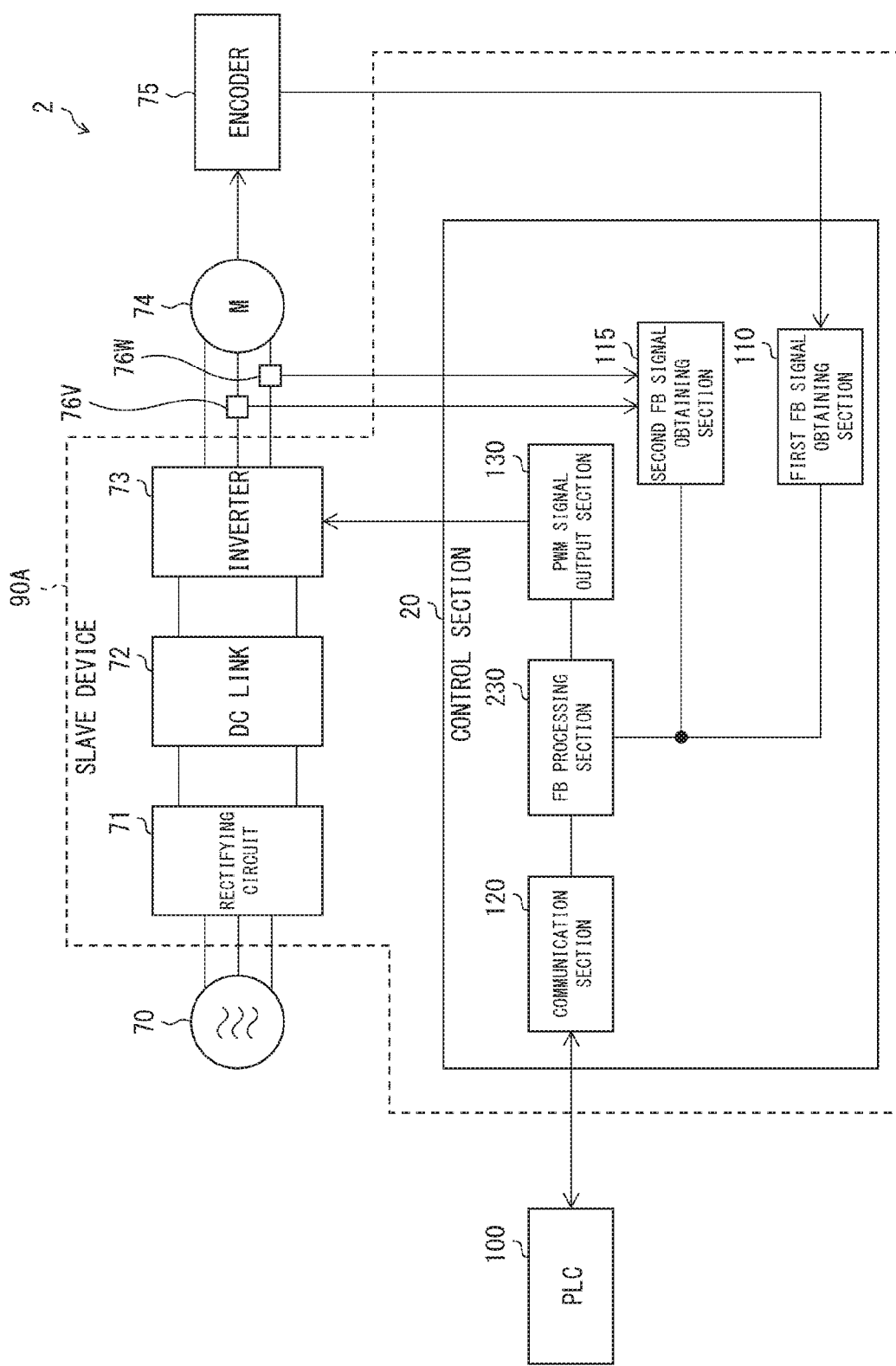
FIG. 5 is a view illustrating a configuration of a main part of an FA system of Embodiment 2.

FIG. 5 is a view illustrating a configuration of a main part of an FA system 2 (motor control system) of Embodiment 2. The FA system 2 includes a slave device that is referred to as a slave device 90A (motor control device). The FA system 2 further includes a control section that is referred to as a control section 20 (chip section). The control section 20 is obtained by adding an FB processing section 230 (feedback processing section) to the control section 10 of Embodiment 1. As in the case of the control section 10, the control section 20 is also packaged as a one-chip IC.

Unlike Embodiment 1, according to Embodiment 2, the control section 20 carries out substantial motor control. Specifically, according to Embodiment 2, the FB processing section 230 carries out FB processing.

The FB processing section 230 (i) obtains a first FB value from a first FB signal obtaining section 110 and (ii) obtains a second FB value from a second FB signal obtaining section 115. The FB processing section 230 obtains command values (a first command value and a second command value) from a PLC 100 via a communication section 120. As in the case of the PLC 100 of Embodiment 1, the FB processing section 230 carries out the FB processing (a motor control process) in accordance with a result of comparison between each of command signals and a corresponding FB signal. The FB processing section 230 supplies an FB processing result to a PWM signal output section 130.

As in the case of Embodiment 1, the PWM signal output section 130 generates a PWM signal in accordance with the FB processing result and supplies the PWM signal to an inverter 73.

As described earlier, the control section 20 (FB processing section 230) can also carry out the FB processing (substantial motor control). The configuration of Embodiment 2 allows the slave device 90A to carry out substantial motor control. This makes it possible to carry out control with respect to a motor 74 at an extremely high speed.

In a case where the control section 20 has a relatively high processing capability, it is possible to employ the configuration of Embodiment 2. Note, however, that the PLC 100 commonly has a higher processing capability than the control section 20. Thus, in order for the control section 20 to carry out a process at a higher speed and consume less electric power, it can be said to be preferable to employ the configuration of Embodiment 1.

[Software Implementation Example]

Control blocks of the FA system 1, 1A, or 2 (particularly, the control sections 10 and 20) can be realized by a logic circuit (hardware) provided in an integrated circuit (IC chip) or the like or can be alternatively realized by software.

In the latter case, the FA system 1, 1A, or 2 includes a computer that executes instructions of a program that is software realizing the foregoing functions. The computer, for example, includes at least one processor and a computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows:

In order to attain the object, the present invention employs the following configurations.

In order to attain the object, a motor control device in accordance with an aspect of the present invention is a motor control device for controlling a motor, the motor control device including: an electric power converting section configured to drive the motor; and a control section configured to control the motor via the electric power converting section, the control section including: a feedback signal obtaining section configured to obtain a feedback signal indicative of a predetermined physical quantity corresponding to an operating state of the motor; a communication section configured to communicate with a master device, which is a host device with respect to the motor control device; and a motor driving signal output section configured to supply, to the electric power converting section, a motor driving signal for causing the electric power converting section to drive the motor, and the control section being implemented by a single integrated circuit (IC) chip.

The configuration allows the control section to be packaged as a one-chip IC. This allows the control section to be smaller in mounting area than a conventional control section. In addition, functional sections of the control section can carry out data communication therebetween at a higher speed. This allows the control section to carry out a process at a higher speed. Furthermore, the control section that carries out a process at a higher speed leads to achievement of a reduction in electric power consumption by the control section. As described earlier, the motor control device in accordance with an aspect of the present invention allows for a further improvement in performance of a motor control device as compared with a conventional motor control device.

In order to attain the object, the motor control device in accordance with an aspect of the present invention can be configured such that: the motor includes a position detecting section configured to detect a position of a rotor of the motor; the feedback signal includes a first feedback signal indicative of the position of the rotor of the motor; and the feedback signal obtaining section includes a first feedback signal obtaining section configured to obtain the first feedback signal from the position detecting section.

The configuration allows the control section to obtain the first feedback signal. This allows the motor control device to control the operating state of the motor in accordance with the first feedback signal.

In order to attain the object, the motor control device in accordance with an aspect of the present invention can be configured such that: the feedback signal includes a second feedback signal indicative of an electric current supplied from the electric power converting section to the motor; and the feedback signal obtaining section includes a second feedback signal obtaining section configured to obtain the second feedback signal.

The configuration allows the control section to obtain the second feedback signal. This allows the motor control device to control the operating state of the motor in accordance with the second feedback signal. Note that the motor control device can alternatively control the operating state of the motor in accordance with both the first feedback signal and the second feedback signal.

In order to attain the object, the motor control device in accordance with an aspect of the present invention can be configured such that: the feedback signal obtaining section supplies the feedback signal to the master device via the communication section; and the motor driving signal output section (i) obtains, via the communication section, a result of feedback processing, carried out by the master device, for controlling the motor and (ii) generates the motor driving signal in accordance with the result of the feedback processing.

The configuration allows the functional sections of the control section to carry out data communication therebetween at a higher speed. This allows the feedback signal to be transmitted to the master device at a high speed. Thus, even in a case where the feedback processing is carried out on the master device side, the control section can respond at a sufficiently high speed, so that the motor control device does not need to carry out the feedback processing (i.e., carry out substantial motor control). This (i) makes it unnecessary for the motor control device to have high performance and (ii) allows the motor control device to consume less electric power.

In order to attain the object, the motor control device in accordance with an aspect of the present invention can be configured to further include: a feedback processing section configured to carry out feedback processing for controlling the motor, the feedback processing section obtaining the feedback signal from the feedback signal obtaining section and carrying out the feedback processing in accordance with the feedback signal thus obtained, and the motor driving signal output section generating the motor driving signal in accordance with a result of the feedback processing.

The configuration allows the motor control device to carry out substantial motor control. This makes it possible to carry out control with respect to the motor at an extremely high speed.

In order to attain the object, the motor control device in accordance with an aspect of the present invention can be configured such that the first feedback signal obtaining section obtains the first feedback signal by serial communication.

The configuration allows the motor control device to cause the control section, which is packaged as a one-chip IC, to suitably obtain the first feedback signal.

In order to attain the object, the motor control system in accordance with an aspect of the present invention can be configured such that the second feedback signal obtaining section obtains the second feedback signal by serial communication.

The configuration allows the motor control device to cause the control section, which is packaged as a one-chip IC, to suitably obtain the second feedback signal.

In order to attain the object, a motor control system in accordance with an aspect of the present invention can be configured to include: a motor control device in accordance with an aspect of the present invention; and the motor.

[Supplemental Remarks]

An aspect of the present invention is not limited to the embodiments, but can be altered by a skilled person in the art within the scope of the claims. An aspect of the present invention also encompasses, in its technical scope, any embodiment derived by combining technical means disclosed in differing embodiments.

REFERENCE SIGNS LIST 1, 1A, 2 FA system (motor control system)
10, 20 Control section
73 Inverter (electric power converting section)
74 Motor
75 Encoder (position detecting section)
90, 90a-90c, 90A Slave device (motor control device)
100 PLC (master device)
110 First FB signal obtaining section (first feedback signal obtaining section, feedback signal obtaining section)
115, 115A Second FB signal obtaining section (second feedback signal obtaining section, feedback signal obtaining section)
120 Communication section
130 PWM signal output section (motor driving signal output section)
230 FB processing section (feedback processing section)

The invention claimed is:

1. A motor control device for controlling a motor, said motor control device comprising:
an electric power converting section configured to drive the motor; and
a control section configured to control the motor via the electric power converting section,
the control section including:
a feedback signal obtaining section configured to obtain a feedback signal indicative of a predetermined physical quantity corresponding to an operating state of the motor;
a communication section configured to communicate with a master device, which is a host device with respect to the motor control device; and
a motor driving signal output section configured to supply, to the electric power converting section, a motor driving signal for causing the electric power converting section to drive the motor, and
the control section being implemented by a single integrated circuit (IC) chip,
said motor control device comprising further comprising:
a feedback processing section configured to carry out feedback processing for controlling the motor,
the feedback processing section obtaining the feedback signal from the feedback signal obtaining section and carrying out the feedback processing in accordance with the feedback signal thus obtained, and
the motor driving signal output section generating the motor driving signal in accordance with a result of the feedback processing.

2. The motor control device as set forth in claim 1, wherein:
the motor includes a position detecting section configured to detect a position of a rotor of the motor;
the feedback signal includes a first feedback signal indicative of the position of the rotor of the motor; and
the feedback signal obtaining section includes a first feedback signal obtaining section configured to obtain the first feedback signal from the position detecting section.

3. The motor control device as set forth in claim 1, wherein:
the feedback signal includes a second feedback signal indicative of an electric current supplied from the electric power converting section to the motor; and
the feedback signal obtaining section includes a second feedback signal obtaining section configured to obtain the second feedback signal.

4. A motor control system comprising:
the motor control device as recited in claim 1; and
the motor.

5. A motor control device for controlling a motor, said motor control device comprising:
an electric power converting section configured to drive the motor; and
a control section configured to control the motor via the electric power converting section,
the control section including:
a feedback signal obtaining section configured to obtain a feedback signal indicative of a predetermined physical quantity corresponding to an operating state of the motor;
a communication section configured to communicate with a master device, which is a host device with respect to the motor control device; and
a motor driving signal output section configured to supply, to the electric power converting section, a motor driving signal for causing the electric power converting section to drive the motor, and
the control section being implemented by a single integrated circuit (IC) chip,
wherein:
the motor includes a position detecting section configured to detect a position of a rotor of the motor;
the feedback signal includes a first feedback signal indicative of the position of the rotor of the motor; and
the feedback signal obtaining section includes a first feedback signal obtaining section configured to obtain the first feedback signal from the position detecting section,
the first feedback signal obtaining section obtains the first feedback signal by serial communication.

6. A motor control system comprising:
the motor control device as recited in claim 5; and
the motor.

7. A motor control device for controlling a motor, said motor control device comprising:
an electric power converting section configured to drive the motor; and
a control section configured to control the motor via the electric power converting section,
the control section including:
a feedback signal obtaining section configured to obtain a feedback signal indicative of a predetermined physical quantity corresponding to an operating state of the motor;
a communication section configured to communicate with a master device, which is a host device with respect to the motor control device; and
a motor driving signal output section configured to supply, to the electric power converting section, a motor driving signal for causing the electric power converting section to drive the motor, and
the control section being implemented by a single integrated circuit (IC) chip,
wherein:
the feedback signal includes a second feedback signal indicative of an electric current supplied from the electric power converting section to the motor; and
the feedback signal obtaining section includes a second feedback signal obtaining section configured to obtain the second feedback signal,
the second feedback signal obtaining section obtains the second feedback signal by serial communication.

8. A motor control system comprising:
the motor control device as recited in claim 7; and
the motor.

* * * * *